United States Patent [19]
Shaheen et al.

[11] Patent Number: 5,920,283
[45] Date of Patent: Jul. 6, 1999

[54] RECEIVER ENGINE FOR GLOBAL POSITIONING SYSTEM

[75] Inventors: David M. Shaheen, Corona; Jeffrey S. Nicholson, Huntington Beach, both of Calif.

[73] Assignee: Conexant Systems, Inc., Newport Beach, Calif.

[21] Appl. No.: 08/853,297

[22] Filed: May 9, 1997

[51] Int. Cl.[6] ....................................................... G01S 5/02
[52] U.S. Cl. ............................................ 342/357; 701/213
[58] Field of Search .............................. 342/357; 701/213

[56] References Cited

U.S. PATENT DOCUMENTS

| | | | |
|---|---|---|---|
| 5,519,403 | 5/1996 | Bickley et al. | 342/357 |
| 5,596,500 | 1/1997 | Sprague et al. | 364/449.7 |
| 5,646,629 | 7/1997 | Loomis et al. | 342/357 |

*Primary Examiner*—Mark Hellner
*Attorney, Agent, or Firm*—Snell & Wilmer L.L.P.

[57] ABSTRACT

A GPS receiver engine is provided having a software interface between the GPS and local applications. The GPS manufacturer provides to the local manufacturer a GPS Chip Set that includes hardware components and software components. The hardware components can include an RF circuit and a processor. The software components can include an object code library and interface files that are used to interface with the local application software. The local manufacturer customizes its local application software to run with the software interface provided by the software components of the GPS Chip Set, stores the GPS software and the local application software into a memory system, and incorporates the RF circuit, processor and memory system into its GPS end product.

39 Claims, 2 Drawing Sheets

RECEIVER ENGINE FOR GLOBAL POSITIONING SYSTEM

BACKGROUND OF THE INVENTION

1. Field of the Invention

The present invention relates generally to Global Positioning System (GPS) products, and in particular, to a GPS receiver engine for use in GPS products.

2. Background Art

Global Positioning Systems (GPS) are presently being used in a wide number of military and commercial applications to enable users anywhere in the world to determine their location precisely by using a receiver to interpret signals from an array of satellites. For example, GPS is used by military aircraft and ground forces to fix locations and pinpoint targets. GPS is also used by commercial aircraft, trucking fleets, vehicles, firefighters, law enforcement organizations, farmers, fishermen, hikers and private pilots. Thus, GPS is used both for navigation and for surveillance purposes. To many recreational users, GPS has increased the safety of many recreational pursuits by providing rescue agencies with the ability to rapidly locate boaters, hikers, skiers, and others who are lost or are in trouble.

The GPS includes an array of satellites that communicate with a receiver, known as a GPS receiver, which calculates its location based on signals received from the satellites. GPS receivers are embodied in discrete end products, ranging from a simple hand-held receiver indicating the location of the receiver, to more complex end products such as car navigation systems, surveying equipment, and telecommunications base stations, among others. These GPS end products can be carried by the users or attached to the objects to be navigated or under surveillance. These GPS end products are manufactured by a number of different OEM or other manufacturers, who essentially incorporate a GPS receiver engine into the GPS end product.

FIG. 1 illustrates the electronics of a typical GPS end product. The GPS end product typically includes a GPS receiver engine provided by the GPS manufacturer on a PC board. Examples of GPS receiver engines are the "NavCore V" and the "MicroTracker" GPS receiver engines manufactured by Rockwell International Corporation, Seal Beach, Calif. The GPS end product typically also includes an OEM or local board which is made by the OEM or "local" manufacturer. Since there are also GPS manufacturers that make the GPS end product by incorporating their own GPS receiver engines, the word "local" as used throughout this disclosure includes both (1) OEM applications purchasing the GPS receiver engines from a GPS manufacturer, and (2) applications made by the same manufacturer of the GPS receiver engine.

The GPS receiver engine includes an RF circuit coupled to an antenna for receiving the signals from the satellites, a signal processing circuit coupled to a microcontroller for digital processing of the received signals, and a memory system containing GPS system software and data. The GPS system software is used to control the microcontroller to make satellite measurements and to perform the necessary calculations. Based on the signals received from the satellites and processed by the signal processing circuit, and the software instructions from the memory system, the microcontroller performs the desired calculations and outputs the navigation data (e.g., position, speed, direction, time, etc.) through a serial port to another serial port at the local board.

The local board also includes a memory system and a microcontroller. The local memory system may be used to store specific map data needed for the intended application. For example, if the GPS end product is intended for use by a vehicle in navigating through the streets of Los Angeles, the local memory system would store street names, directions and other specific map data required for such navigation. Using the map data from the local memory system, the local microcontroller translates the raw navigation data received from the GPS receiver engine into human-readable specific data, which is then output on a display associated with the GPS end product. Depending on the intended application, the GPS end product may also include a keypad or other input device that allows the user to initialize and configure the GPS end product, to enter way points for navigation, or to select different map datum. The data entered at the local board may be communicated with the GPS receiver engine via the serial port interface. A second serial port may be provided to allow the GPS end product to communicate with another separate product or device, such as a PC.

The above-described configuration suffers from the drawback that the manufacturer of the end product (also known as the local manufacturer) must provide its own microcontroller and memory system to host its application and to interface with the GPS receiver engine. As a result, two microcontrollers and two memory systems are required for each GPS end product. The cost and complexities associated with the additional microcontroller and memory system have posed problems. First, the required interface between the GPS receiver engine and the local board renders the application more prone to failures occurring during production and operation, since the increased number of components increases the likelihood of failures, and the interaction between a larger number of components results in a larger number of failure points. Second, the use of additional components increases the test time and the complexity of the tests. Third, the serial port interface between the GPS receiver engine and the local board results in communication delays between the two microcontrollers. Fourth, the resulting GPS end product would also be larger since it has additional components. Fifth, the use of an additional microcontroller and memory system increases power consumption which reduces battery life.

SUMMARY OF THE INVENTION

It is an object of the present invention to provide a GPS receiver engine which provides a software solution to the data interface between the GPS and local applications.

It is another object of the present invention to provide a GPS receiver engine that has a simple, efficient and cost-effective interface with the application of the GPS end product.

It is yet another object of the present invention to provide a GPS receiver engine that reduces the number of components in the GPS end product.

It is a further object of the present invention to provide a GPS receiver engine that eliminates the requirement of providing additional microcontrollers and memory systems.

It is yet a further object of the present invention to provide a GPS receiver engine that allows the local application of the end product to be built and integrated with the GPS application.

It is yet a further object of the present invention to provide a GPS receiver engine that allows the local application of the end product the flexibility to customize the combined GPS/local application, while preventing the local application from breaking the fundamental real-time requirements of the GPS measurement engine software.

The present invention provides a GPS receiver engine having a software interface between the GPS and local applications. The GPS manufacturer provides to the local manufacturer a GPS Chip Set that includes hardware components and software components. The hardware components can include an RF circuit for receiving signals from a plurality of satellites, a digital signal processing (DSP) circuit for processing the received signals, and a microcontroller for calculating and reporting data based on the received signals. The software components can include an object code library and interface files that are used to interface with the local application software. The local manufacturer customizes its local application software to run with the software interface provided by the software components of the GPS Chip Set, stores the GPS software and the local application software into a memory system, and incorporates the RF circuit, DSP circuit, microcontroller and memory system into its GPS end product.

According to one embodiment of the present invention, the RF circuit, the DSP circuit, the microcontroller, and the memory system are all provided on a single PC board. The GPS end product can also include an RF antenna coupled to the RF circuit for receiving signals from the plurality of satellites, and a serial port for communication with other devices.

In one embodiment according to the present invention, the object code library includes a measurement engine for measuring the received signals and producing measurement data, a navigation engine communicating with the measurement engine for deriving a navigation solution based on the measurement data, a kernel support communicating with the measurement engine and the navigation engine, and a local interface communicating with the navigation engine and the kernel support for interfacing with the local application software. The local interface provides a plurality of execution threads in which the local application is allowed to run. The measurement engine is preferably isolated from the local application software to prevent the local application from breaking the fundamental real-time requirements of the GPS measurement engine software.

As a result of the software interface provided by the present invention between the GPS and local applications, only one microcontroller and one memory system is needed since both the GPS software and the local application software will run on the microcontroller provided by the GPS manufacturer and can be resident in the same memory system.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known data processing techniques, devices and circuits are omitted so as to not obscure the description of the present invention with unnecessary detail.

The GPS receiver engine according to the present invention provides a software solution to the interface between the GPS and local applications. The GPS manufacturer provides to the local manufacturer a GPS Chip Set that includes hardware components and software components. The hardware components can include an RF circuit, a digital signal processing (DSP) circuit, and a microcontroller. The software components can include an object code library and interface files. The local manufacturer incorporates the hardware components into its GPS end product, and customizes its local application software to run with the software interface provided by the software components of the GPS Chip Set. As a result, only one microcontroller and one memory system is needed since both the GPS software and the local application software will run on the microcontroller provided by the GPS manufacturer and can be resident in the same memory system.

Figure 1:
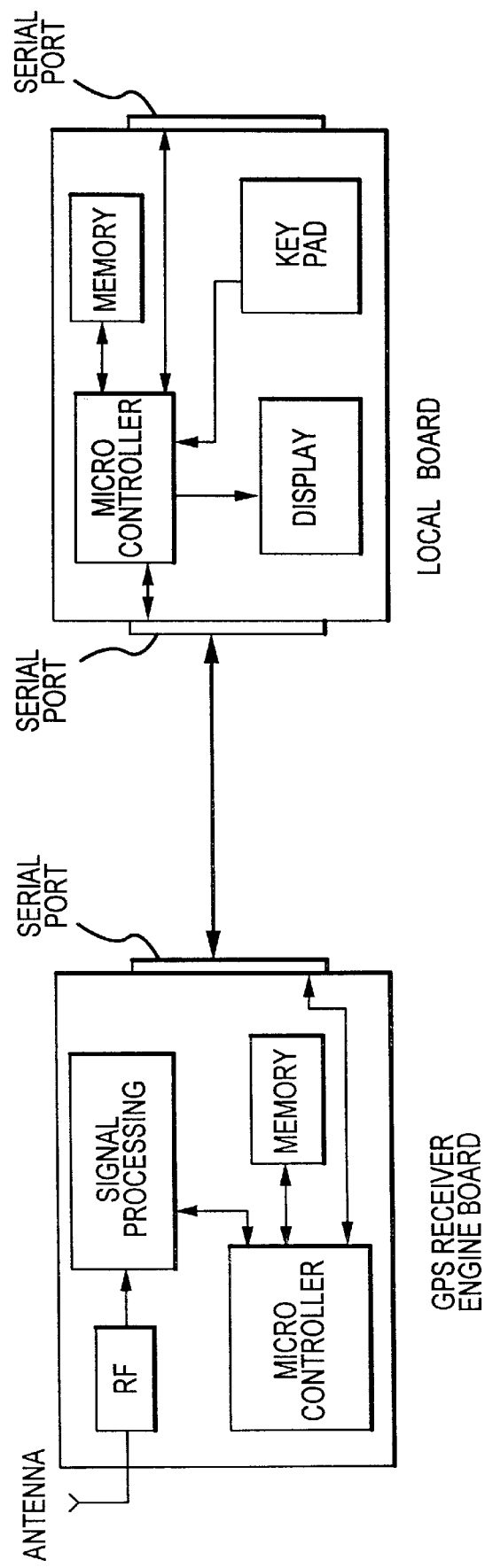
FIG. 1 is a simplified block diagram illustrating the electronics of a conventional GPS end product.
Figure 2:
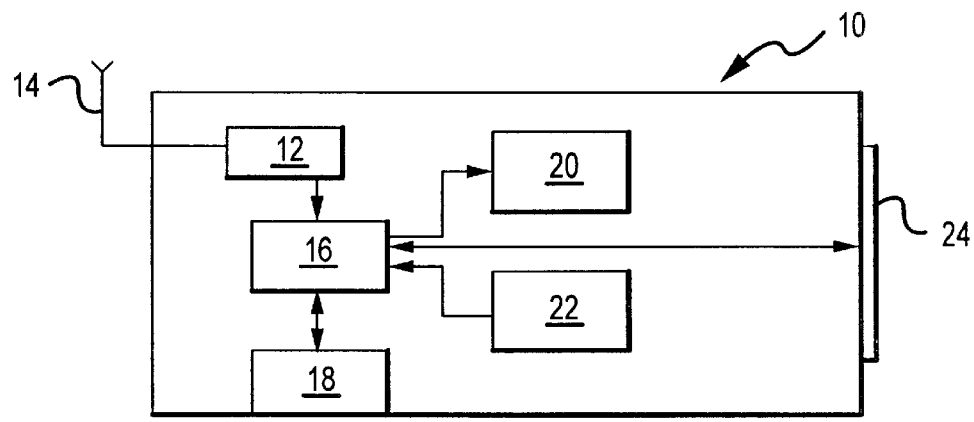
FIG. 2 is a simplified block diagram of the electronics of a GPS end product according to the present invention.

FIG. 2 is a simplified block diagram of the electronics 10 of a GPS end product according to the present invention. The electronics 10 includes an RF circuit 12 for receiving RF signals from the satellites via an RF antenna 14. The RF circuit 12 is coupled to a microcontroller and digital signal processing module 16 which includes the microcontroller and digital signal processing capabilities. Although the microcontroller and digital signal processing (DSP) module 16 is illustrated as having the microcontroller and digital signal processing capabilities provided on a single chip, those skilled in the art will appreciate that the microcontroller and digital signal processing capabilities can be provided on separate chips. A memory system 18 is coupled to the microcontroller and DSP module 16. In a non-limiting embodiment according to the present invention, the memory system 18 may include a RAM that stores system data, a non-volatile program memory (such as a ROM) for storing software, microcontroller instructions and constant data, and a non-volatile data memory (such as an EEPROM) for storing system data that must be retained in the event of power outages. In another non-limiting embodiment according to the present invention, the non-volatile data memory can be omitted if back-up power is provided to the RAM to retain its contents at all times.

The electronics 10 may further include a display 20 coupled to the microcontroller and DSP module 16 for displaying relevant data, such as the position, time, direction and velocity of the GPS end product. The display 20 is optional, depending on the applications of the end product, since some applications do not require a display. An input device 22, such as a key or number pad, may also be coupled to the microcontroller and DSP module 16 for allowing the user to input initialization and system configuration data and commands (such as the initial position or time), enter way points for navigation, and select different map datum, among other input functions. Again, the input device 22 is optional, since some applications do not require or allow the input of information. A serial port 24 may also be coupled to the microcontroller and DSP module 16 for allowing the GPS end product to communicate with another product or device, such as but not limited to a PC.

Figure 3:
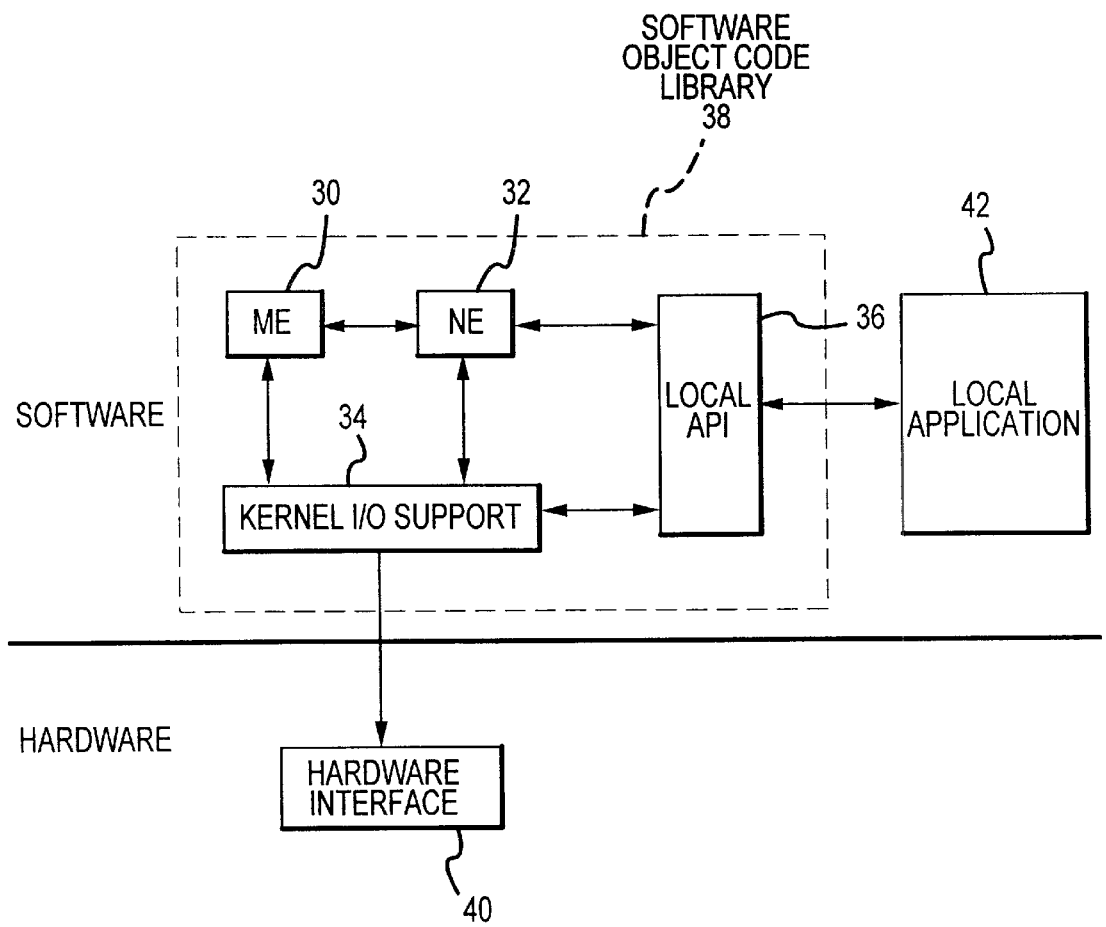
FIG. 3 is a simplified schematic block diagram of the hardware and software interface resident in the GPS end product of FIG. 2.

FIG. 3 illustrates the software architecture according to a preferred embodiment of the present invention. The software is organized into four logical components, a Measurement Engine 30 (ME), a Navigation Engine 32 (NE), a Kernel-I/O Support 34 ("Kernel Support"), and a local Application Programming Interface 36 (API). As shown in FIG. 3, the ME 30, NE 32 and Kernel Support 34 components communicate with each other, while the local API 36 communicates only with the NE 32 and the Kernel Support 34 components. The ME 30, NE 32, Kernel Support 34 and local API 36 together form the software object code library 38 (see the box created by the dashed lines in FIG. 3) that is provided by the GPS manufacturer to the local manufacturer.

The ME component 30 performs all the high rate interrupt and signal processing functions associated with GPS satellite measurement, such as acquisition, tracking, and data demodulation, among others. Its primary function is to produce GPS measurements and telemetry data for all visible satellites at a 1 Hz interval in an autonomous or commanded mode. The architecture of the ME 30 is dependent upon the hardware architecture of the DSP. In other words, the ME 30 is not portable.

The NE component 32 produces the GPS derived navigation solution (e.g., velocity, position, time), using the measurement and telemetry data from the ME 30. Supporting functions of the NE 32 include satellite database management, satellite state computation, visible satellite list generation, and differential GPS correction management. The architecture of the NE 32 is hardware independent, and is designed to run as a single thread background process. The accuracy of the navigation solution (i.e., position, time, velocity, etc.) will be maximized when the NE 32 is allowed to process every measurement set by the ME 30 (i.e., 1 Hz solution). The NE 32 is tolerant of local processing holding off execution by the NE 32, even to the point where measurement sets can be missed. However, causing the NE 32 to miss one or more measurement sets may compromise the accuracy of the navigation solution.

The Kernel Support component 34 provides low-level services for communicating with the Hardware Interface 40 and Real-Time Executive (RTE) capabilities for scheduling and managing multi-priority tasks in a preemptive tasking architecture. For example, the Kernel Support 34 drives the serial ports, and performs serial message processing and clock services, as part of its primary function of interfacing with the hardware. The Hardware Interface 40 includes serial ports, Real-Time Clock (RTC), General Purpose I/O (GPIO), and serial EEPROM, among others.

The local API 36 provides a software interface between the GPS application and the local application 42. The local API 36 provides the traditional set of parameters for initializing inputs (e.g., initial position, initial time, configuration parameters, etc.) to the GPS software and for retrieving outputs (e.g., navigation solutions such as position, velocity, time, etc.) from the GPS software. The local API 36 also provides the services required for the local application 42 to make use of the system resources, such as access to serial ports, and GPIO, provided by the GPS Chip Set. In addition, the local API 36 provides general status and control (e.g., GPS software library version information, initialization completion status, current GPS set time), and configuration capabilities (e.g., controlling the handling of errors, generating error messages, and identifying the hardware configuration of optional hardware components) to the local application 42. The local API 36 further provides utilities for managing controlled access to shared memory within the local application 42.

The local API 36 is organized into four basic execution threads: initialization, the 10 Hz task, the 1 Hz task, and the background task. These threads act as interfaces to the GPS application. The initialization thread initializes and configures the system for interface with the local application 42, and allows the local application 42 to initialize its internal data structures. The 10 Hz task is the highest priority for the system, followed by, in descending order of priority, the 1 Hz task and the background task.

The 10 Hz task provides an execution opportunity once every 100 msec. This task is used by the Kernel Support 34 component to service input data streams so that the size of input buffers can be kept small, and to minimize data response time. In general, the local application 42 is allowed to run in this execution thread, and this execution thread should be used to poll input data sources and set event flags to trigger processing in the lower rate and lower priority tasks.

The 1 Hz task provides an execution opportunity once a second. This task is used by the Kernel Support 34 component to format and queue all currently scheduled output messages and queue any scheduled GPS EEPROM updates. The local application 42 is also allowed to run in this execution thread.

The background task runs whenever there is no higher priority processing scheduled. The primary GPS application which runs in the background is the main execution thread of the NE 32. The NE 32 process is always looking for a new measurement set from the ME 30, and when the new data is found, a new navigation solution is calculated. The majority of local applications 42 are expected to be executed in this background thread, since this will be the least intrusive on the GPS application. Also, since the NE's solution is updated from this execution thread, any local application 42 that requires this solution data should be placed in this thread.

Although the software architecture according to the present invention has been illustrated in FIG. 3, those skilled in the art will appreciate that the illustrated software architecture can be modified without departing from the spirit and scope of the present invention. For example, FIG. 3 illustrates the ME 30 and NE 32 as separate components. Providing the ME 30 and NE 32 as separate components allows the ME 30 to be isolated from the local application 42, as explained in greater detail hereinbelow, and provides the GPS manufacturer with increased flexibility. For example, the system can be scaled down to a measurement-only system, or the GPS manufacturer can provide different NE 32 components for different local applications 42. However, it is also possible to provide the MIE 30 and the NE 32 components as one component. In such an embodiment, the single component would include the ME 30 and NE 32 functions.

As another possible modification, the Kernel Support 34 can be omitted so that the local application 42 communicates directly with the Hardware Interface 40. In such an embodiment, the ME 30 and NE 32 components would communicate directly with the Hardware Interface 40, with the local application 42 communicating directly with the Hardware Interface 40 and communicating with the NE32 component via the local API 36.

In a preferred embodiment of the present invention, the GPS manufacturer provides (i.e., sells) the local manufacturer with a GPS Chip Set that includes the RF circuit 12, the microcontroller and DSP module 16, the software object code library 38, and API files. The local manufacturer then customizes its local application software 42 with the requirements of the local API 36, and stores the combined GPS-local software in the non-volatile program memory in the memory system 18. The local manufacturer then adds the other components of the GPS end product, including the display 20 and the input device 22, if needed, and the RF antenna 14 so that these components are provided on a single PC board, The product housing can then be built and used to house the PC board to provide the assembled GPS end product.

Although it would be preferable for the local manufacturer to provide the RF circuit 12, the microcontroller and DSP module 16, the memory system 18, the RF antenna 14, and the optional display 20 and input device 22 on the same PC board, those skilled in the art will appreciate that this is not required, and some of these components can be provided on different PC boards. However, providing more than one PC board will increase the complexity, size and cost of the resulting GPS end product.

In accordance with the present invention, data and services that were previously routed through the hardware interface over the serial ports are now available via the local API 36. The interface supported by the local API 36 provides the local application 42 direct access to and control of all the key operational parameters, as well as access to many of the peripherals available on the microcontroller, including both serial ports and some of the GPIO lines. The integration of the GPS and local applications allows the local application 42 to run with the GPS application on the same microcontroller, and share the same memory devices, thereby resulting in a system having fewer and simpler components and interfaces, which in turn reduces the cost and complexity of the GPS end product.

Another benefit achieved by the GPS-local interface of the present invention is that the architecture illustrated in FIG. 3 will not allow the local application 42 to break the real-time ME 30 processing. In other words, the operations of the ME 30 are isolated from any potential local interference. While the performance of the NE 32 can be affected by the local application 42, the ME 30 is architecturally isolated from the local application 42 to prevent any tampering with the underlying GPS satellite measurement activity.

Although certain circuits, components, subsystems, and blocks have been described above as including certain elements, it will be appreciated by those skilled in the art that such disclosures are non-limiting, and that different elements, or combinations thereof, can be provided for such circuits, components, subsystems, and blocks without departing from the spirit and scope of the present invention.

In addition, the components of the electronics 10 described hereinabove can be selected from standard and conventional components, including currently-available off-the-shelf components, or they can be components that have been specifically designed and manufactured specifically for use with the GPS receiver engine of the present invention.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. Apparatus communicating with a plurality of satellites for use in providing data to a local application, comprising:
   an RF circuit for receiving signals from a plurality of satellites;
   a processor coupled to the RF circuit for processing the received signals and for calculating data based on the received signals; and
   a software system configured to communicate with the processor, wherein the software system is further configured to provide a software interface with the local application.

2. The apparatus of claim 1, wherein the software system comprises a software object code library and interface files.

3. The apparatus of claim 2, wherein the software object code library comprises:
   a measurement engine for measuring the received signals and producing measurement data;
   a navigation engine communicating with the measurement engine for deriving a solution based on the measurement data;
   a kernel support communicating with the measurement engine and the navigation engine; and
   a local interface communicating with the navigation engine and the kernel support for interfacing with the local application.

4. The apparatus of claim 3, wherein the measurement engine is isolated from the local application software to prevent interference with the measuring activities of the measurement engine.

5. The apparatus of claim 4, wherein the local interface provides a plurality of execution threads in which the local application is allowed to run.

6. The apparatus of claim 5, wherein the plurality of threads includes a background task in which a majority of the local applications are run.

7. The apparatus of claim 2, further comprising a memory system, wherein the local application and the software system are both resident in the memory system.

8. The apparatus of claim 1, wherein the processor calculates navigational data based on instructions received from the local application and the software system.

9. The apparatus of claim 7, wherein the RF circuit, the processor, and the memory system are all provided on a single PC board.

10. The apparatus of claim 1, further comprising an RF antenna coupled to the RF circuit, the RF antenna receiving signals from a plurality of satellites.

11. The apparatus of claim 1, further comprising a serial port for communication with other devices.

12. A method of building an apparatus for use in providing navigational data in a local application, comprising the steps of:
   a. providing an RF circuit for receiving signals from a plurality of satellites;
   b. coupling a processor to the RF circuit for processing the received signals and for calculating data based on the received signals;
   c. providing a receiver engine software for calculating the data;
   d. providing a local application software for controlling the operations of the apparatus; and
   e. providing a software interface for interfacing the receiver engine software and the local application software.

13. The method of claim 12, wherein step (c) further includes the steps of:
   c1. providing a measurement engine for measuring the received signals and producing measurement data;
   c2. providing a navigation engine communicating with the measurement engine for deriving a solution based on the measurement data;
   c3. providing a kernel support communicating with the measurement engine and the navigation engine; and c4. providing a local interface communicating with the navigation engine and the kernel support for interfacing with the local application software.

14. The method of claim 13, wherein step (c) further includes the step of:
c5. providing interface files.

15. The method of claim 13, further including the step of: isolating the measurement engine from the local application software.

16. The method of claim 12, further including the step of: providing the receiver engine software, the local application software, and the software interface in a single memory system.

17. The method of claim 16, further including the step of: providing the RF circuit, the processor, and the memory system on a single PC board.

18. The method of claim 13, wherein step (c4) further includes the step of providing a plurality of execution threads in which the local application is allowed to run.

19. A method of interfacing communication between a GPS receiver engine and a local apparatus into which the GPS receiver engine is to be incorporated, comprising the steps of:
 a. providing local application software for controlling the operations of the local apparatus; and
 b. providing a software interface for interfacing the GPS receiver engine and the local application software.

20. The method of claim 19, wherein step (b) further includes the steps of:
 b1. providing a measurement engine for measuring signals received from a plurality of satellites and for producing measurement data;
 b2. providing a navigation engine communicating with the measurement engine for deriving a solution based on the measurement data;
 b3. providing a kernel support communicating with the measurement engine and the navigation engine; and
 b4. providing a local interface communicating with the navigation engine and the kernel support for interfacing with the local application software.

21. The method of claim 20, further including the step of: isolating the measurement engine from the local application software.

22. The method of claim 20, wherein step (b4) further includes the step of providing a plurality of execution threads in which the local application is allowed to run.

23. Apparatus communicating with a plurality of satellites for use in providing data to a local application, comprising:
 an RF circuit for receiving signals from a plurality of satellites;
 a processor coupled to the RF circuit for processing the received signals and for calculating data based on the received signals;
 a memory system coupled to said processor, the memory system being configured to receive the local application; and
 a software system resident in said memory system configured to communicate with the processor and the local application.

24. The apparatus of claim 23, wherein the software system comprises a software object code library and interface files.

25. The apparatus of claim 24, wherein the software object code library comprises:
 a measurement engine for measuring the received signals and producing measurement data;
 a navigation engine communicating with the measurement engine for deriving a solution based on the measurement data;
 a kernel support communicating with the measurement engine and the navigation engine; and
 a local interface communicating with the navigation engine and the kernel support for interfacing with the local application.

26. The apparatus of claim 25, further comprising means for isolating the measurement engine from the local application.

27. The apparatus of claim 25, wherein the local application and the software system are both resident in the memory system.

28. The apparatus of claim 25, wherein the RF circuit, the processor, and the memory system are all provided on a single PC board.

29. The apparatus of claim 25, wherein the local interface provides a plurality of execution threads in which the local application software is allowed to run.

30. The apparatus of claim 29, wherein the plurality of threads includes a background task in which a majority of the local applications are run.

31. A set of components for use in a GPS end product communicating with a plurality of satellites for use in providing data to a local application, the set comprising:
 an RF circuit for receiving signals from a plurality of satellites;
 a signal processor for processing the received signals;
 a controller for calculating data based on the received signals;
 a memory system; and
 a software object code library configured to provide a software interface to the local application, wherein said software object code library and the local application are installed in the memory system.

32. The set of claim 31, wherein the software object code library comprises:
 a measurement engine for measuring the received signals and producing measurement data;
 a navigation engine communicating with the measurement engine for deriving a navigation solution based on the measurement data;
 a kernel support communicating with the measurement engine and the navigation engine; and
 a local interface communicating with the navigation engine and the kernel support for interfacing with a local application.

33. The apparatus of claim 32, wherein the local interface provides a plurality of execution threads in which a local application is allowed to run.

34. The apparatus of claim 33, wherein the plurality of threads includes a background task in which a majority of local applications are run.

35. A method of providing navigation data in a local application using a receiver engine, comprising the steps of:
 a) receiving signals from a plurality of satellites;
 b) processing the received signals and calculating the navigation data based on the received signals;
 c) interfacing the navigation data to the local application using a software interface; and
 d) interfacing the receiver engine to the local application using the software interface.

36. The apparatus of claim 7, wherein the memory system is a Random Access Memory (RAM).

37. The apparatus of claim 7, wherein the memory system further comprises a non-volatile program memory and a non-volatile data memory.

38. The apparatus of claim 37, wherein the non-volatile program memory is a Read-Only Memory (ROM).

39. The apparatus of claim 37 wherein the non-volatile data memory is an Electrically Erasable Programmable Read-Only Memory (EEPROM).

* * * * *